Figure 1:
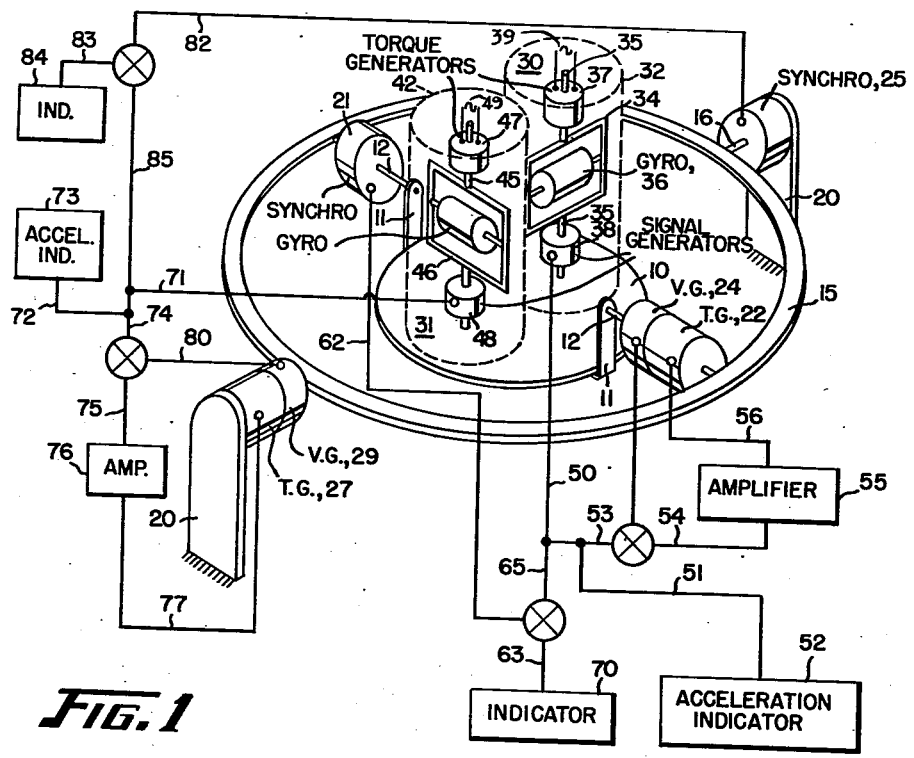

Oct. 29, 1957  C. R. BONNELL  2,811,043
VERTICAL REFERENCE AND ACCELERATION APPARATUS
Filed June 21, 1954

INVENTOR
CHARLES R. BONNELL
BY George H Fisher
ATTORNEY

United States Patent Office 2,811,043
Patented Oct. 29, 1957

2,811,043

VERTICAL REFERENCE AND ACCELERATION APPARATUS

Charles R. Bonnell, Columbia Heights, Minn., assignor to Minneapolis-Honeywell Regulator Company, Minneapolis, Minn., a corporation of Delaware Application June 21, 1954, Serial No. 438,206

8 Claims. (Cl. 74—5.34)

My invention relates to improved reference apparatus and more particularly to an improved vertical reference and acceleration instrument.

The physical pendulum has long been used as a vertical reference and it has been recognized that such a device is normally acted upon by a multitude of accelerations which result in a departure of the device from a true vertical position to that of an apparent vertical position due to the acceleration forces thereon. There have been attempts in the past to modify the operation of the pendulum such that the acceleration forces are neutralized.

In the present invention, the acceleration forces are measured in an improved manner and the deflection of the pendulum due to the acceleration is measured as an indication of acceleration. Further, the position of the pendulum with respect to the body upon which it is mounted and the acceleration deflection are combined to produce a true indication of the position of the body with respect to true vertical. To provide a reference with respect to a pair of displacement axes and accelerations along such axes, this apparatus includes a pair of accelerometers which are pendulously mounted about a pair of axes to eliminate vehicle or body attitude errors. Thus only the horizontal components of acceleration are allowed to deflect the pendulum with the accelerometers and their mounting. The apparatus provides for continuous and simultaneous information with respect to the horizontal components of acceleration, the angular deflection between true and apparent vertical and a displacement attitude of the body with respect to the axes of the device.

It is therefore an object of this invention to provide an improved attitude and acceleration sensing and indicating apparatus. It is also an object of this invention to provide a pendulous member mounted for displacement about a pair of axes and including means for eliminating the effect of acceleration on the signal produced by the pendulous member. Another object of this invention is to provide an improved acceleration sensing apparatus such that continuous information on the angular displacement of the gravity sensor between true and apparent vertical may be continuously supplied. These and other objects of this invention will become apparent from a reading of the attached description together with the drawings wherein Figure 1 is a schematic disclosure of the apparatus and Figure 2 is a block diagram of the elements making up our improved apparatus and the inter-connection between the same.

Figure 2:
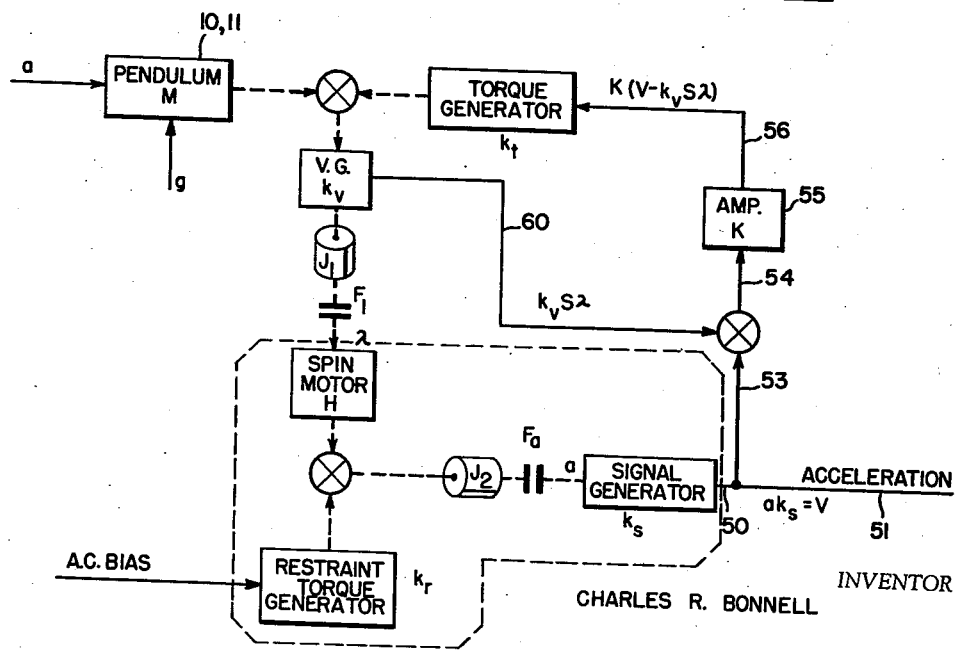

My invention is shown schematically in Figure 1 as including a platform 10 which is pendulously mounted by means of straps 11 and pivots 12 on a gimbal 15 through suitable means such as bearings, not shown. Gimbal 15 in turn is pivotally mounted through pivots 16 to frame members 20 through suitable means such as pivots or bearings, not shown. The frame members 20 mount the platform on the object, such as an aircraft, whose attitude and acceleration it is desired to determine.

Thus, the platform 10 is mounted through the pivots 12 and 16 of the gimbal 15 to axes of displacement normal to one another and defined by the pivots. Associated with the gimbal 15 and pivots 12 for the inner axis of displacement is a synchro unit indicated at 21 which reflects or produces a signal in proportion to displacement of the platform with respect to the gimbal about the pivot axis 12. At the opposite extremity of the platform and associated with the opposite pivot is a torque generator indicated at 22 and a velocity generator indicated at 24 each of which are connected respectively to the gimbal and the pivot structure. The velocity generator 24 is designed to produce a signal in proportion to the speed of displacement of the platform relative to the gimbal and the torque generator 22 is designed when energized to produce a torque between the platform 10 and gimbal 15 with a resultant movement between these members. Associated with the pivots 16 and frame 20 is a synchro 25 which produces a signal in proportion to the movement of the gimbal relative to the frame 20 in a well known manner. At the opposite extremity of the gimbal 15 and associated with the opposite pivot member 16 is a torque generator 27 and velocity generator 29 connected in part to the pivots and in part to the frame member. The velocity generator operates in the same manner as the velocity generator 24 associated with the inner axis and produces a signal in proportion to speed of rotation of the gimbal 15 with respect to the frame member 20. Similarly, the torque generator 27 is designed when energized to produce a torque between the frame member 20 and gimbal 15 to produce resultant rotation of the gimbal 15.

The synchros 21 and 25 are shown in block form inasmuch as they are conventional in detail and this detail forms no part of the subject invention. Any suitable signal generating device could be used which produces a signal in proportion to relative movement of a pair of parts. The velocity generators 24 and 29 are also shown in block form with detail omitted inasmuch as this detail forms no part of this subject invention. Any suitable generating device which would produce an output in proportion to velocity of movement of one member relative to another could be utilized for this purpose. The torque generators 22 and 27 are also shown in block form with detail omitted inasmuch as their details form no part of the subject invention. Any suitable motor device designed to produce torque and provided for limited movement could be suitably substituted here.

Mounted on platform 10 are a pair of gyros 30 and 31 which are identical in structure. Gyro 30 includes a casing 32 which mounts a gimbal 34 through suitable means such as pivots 35, the gimbal in turn journaling a rotor mass 36 with suitable motive means for spinning the rotor mass. Attached at one extremity of the gimbal and associated with the casing and pivots is a torque generator 37 and at the other extremity of the casing and gimbal is a signal generator 38. These units are also shown schematically and are the type shown in the Mueller Patent 2,488,734, dated November 22, 1949. The spin axis for the rotor mass of gyro 30 is aligned normal to the displacement axis of the pendulum or platform 10 identified through pivots 12 such that the input axis of the gyro which is normal to the spin axis at this point will be parallel with the displacement axis of the platform and thus the gyroscope 30 will be capable of sensing acceleration of displacement imparted to the platform 10 about this displacement axis. Gyro 31 also includes a gimbal structure 46 mounted on pivots 45 with a signal generator 48 and a torque generator 47 mounted at opposite extremities of the gimbal. Torque generators 37 and 47 are provided with suitable winding means, not shown, which are energized from suitable sources of alternating current voltages 39 and 49 respectively. This arrangement functions in a manner analogous to the device shown in Figure 4 of the above mentioned Mueller Patent 2,488,734. The action of this arrangement is to develop a biasing force on the output shaft of the torque generators 37 and 47 that varies with the magnitude of the voltage 49 applied as well as the displacement of the output shaft away from its null position. The biasing force is analogous to a recentering spring in that it tends to return the output shaft to its null position. Although not specifically shown in the Figure 1, the gyroscope 30 and 31 are of the fluid damped type, the casings 32, 42 respectively contain a fluid which surrounds the gimbal and pivot means to damp the same in a conventional manner. It should be recognized further that the gimbals would be enclosed with a separate enclosure (not shown) such that the liquid would not come in contact with the spinning rotor to affect the operation thereof but rather the fluid would engage and damp only the exposed portions of the gimbal and shaft remote from the rotating mass. It should also be noted that the spin axis of the gyro 31 would be normal to the spin axis of the gyro 30 and would be normal to the displacement axis of the platform indicated by the pivots 16 such that the input axis of the gyroscope would be aligned therewith so that the gyroscope 31 would respond to acceleration or displacement of the platform about this displacement axis of the platform. It should be noted that the position of the platform relative to the frame will be sensed and indicated by the synchros 25 and 21 for the respective displacement axis of the platform and under conditions of no acceleration, the platform will be referenced to true vertical.

Considering now the effect of an acceleration force on the platform 10 of the apparatus and in particular to the operation of the gyroscopes and the interconnection of the same with the torque and velocity generators, reference is made to Figure 2 which in block form discloses schematically the interconnection between these devices and an indication of the type of forces supplied to the same. Basically the platform 10 through its pivot or structure becomes a pendulum pivoted for universal two degrees of freedom. Acting upon the pendulum are acceleration forces $a$ and a gravity force $g$ as indicated in Figure 2. The Figure 2 shows a signal generator and a cooperating torque generator and velocity generator for one axis of displacement of the platform. The resultant force will therefore be seen as a resultant movement of the pendulum applied through mechanical connections to the velocity generator and at the same time is impressed upon the gyroscope. With reference to Figure 2 the mass shown at J1 represents the moment of inertia of the complete pendulum and the numeral F1 represents the damping for the pendulum inherent in the bearings, etc. H represents the spin momentum of the spin motor and its mass, J2 represents the moment of inertia of the gyro output axis or the mass and the gimbal of the gyroscope. Fa represents the fluid damping coefficient of the gyro output axis and $K_s$ the signal generator mounted on the shaft of the gyroscope with a sensitivity of $K_s$. Also acting on the gimbal is the restraint of the torque generator with the sensitivity $K_r$ being energized from an A. C. bias signal. The output of the signal generator is proportional to the acceleration component of motion input and is indicated by the letter V. Thus in Figure 1 the signal generator is connected through a connection indicated at 50 and through a connection 51 to an acceleration indicator 52 shown in block form. At the same time the output of the signal generator is also fed through a connection 53 to a connection 54, an amplifier indicated schematically in block form at 55, and to a connection 56 leading to the torque generator 22. Thus the acceleration component in terms of a signal proportional to the same energizes the torque generator to apply to the axis of the pendulum about which the acceleration is sensed a torque in proportion to the acceleration signal for damping purposes. This torque is also applied through the velocity generator indicated at the velocity generator 24 indicated through the letters VG and having a sensitivity $K_v$. The output of velocity generator is also directly connected through a connection 60 to the conductor 54 in a degenerated feedback arrangement to the amplifier 55 for damping purposes. In the configuration of Figures 1 and 2 the components are not shown in detail, and the connections between the two are indicated generally, it being understood that they will be electrical connections. Further it should be understood that the individual devices having positional inputs or motion inputs will also include suitable energizing sources such that the motion input may be translated into an electrical signal output.

Synchro unit 21 for this axis of displacement is also connected by a connection 62 and a connection 63 to an indicator 70 which indicates attitude of the body with respect to vertical about this displacement axis. To compensate for acceleration effect, the acceleration signal is supplied from the connection 50 through a connection 65 to diminish or compensate for the displacement signal to the extent that acceleration affects the same.

The opposite displacement axis of the gyroscope, that is the axis formed by the pivots 16 is fed with the acceleration signals from the generator 48 through conductors 71 and 72 to an acceleration indicator 73 shown in block form for this axis. This acceleration signal is also fed through a connection 74 and connection 75 to an amplifier 76, and from a connection 77 to the torque generator 27. The output of the velocity generator 29 for this axis is fed back in a degenerative feedback hookup through a connection 80 to the input of the amplifier 76. Synchro 25 for this displacement axis is connected by a connection 82 and a connection 83 to an indicator 84 which is also energized degeneratively by the acceleration signal from the signal generator 48 through connections 71 and 85. The torque bias produced as a result of the voltages from sources 39 and 49 by the torque generators 37 and 47 gyros 30 and 31 respectively is just enough to overcome gyro frictional errors so that there will be a slow drift of gimbals 34 and 36 toward their null position, insuring that errors of this type will not accumulate and that the gyro won't finally migrate to its stops.

In operation the apparatus operates the pendulum with an accelerometer attached, the accelerometer sensing acceleration forces applied to the object on which the apparatus is mounted and providing signal output in proportion to the same. The torque supplied to the pendulum by the torque generators in proportion to acceleration reduces error with respect to vertical components of acceleration, and the velocity generator is included in the pendulum mounting to sense velocity displacement for damping purposes. Further the displacement of the pendulum as a reference device is utilized and a signal taken therefrom to give an indication of the position of the object upon which the pendulum is mounted with respect to true vertical. The acceleration signal is out phased from the synchro output so that the remaining signal is indicative of the attitude change of the object upon which the pendulum is mounted. The apparatus is designed to be mounted so that both displacement axes are horizontal such that one could correspond to pitch and the other to roll and such be utilized as a replacement for a vertical gyro or similar reference device.

In considering this invention it should be kept in mind that the present disclosure is intended to be illustrative only and that the scope of the invention is to be determined by the appended claims.

I claim as my invention:

1. Apparatus of the class described comprising, a member pivotally and pendulously mounted about an axis and upon an object whose acceleration it is desired to determine, a single degree of freedom gyroscope mounted on said member and positioned to respond to acceleration of said member about said axis, means connected to said gyroscope and producing a signal output in response to the acceleration, torque generator means connected to the mounting of said member at said axis for applying torque to said member about said axis, velocity generator means connected to said member and producing a signal in proportion to speed of movement of said member about said axis, means interconnecting said signal producing means and said velocity generator means to said torque generator to control the energization of the same, and indicator means connected to said signal producing means to indicate the acceleration of said object.

2. Apparatus of the class described comprising, a member pivotally and pendulously mounted about an axis and upon an object whose attitude and acceleration it is desired to determine, a single degree of freedom gyroscope mounted on said member and positioned to respond to acceleration of said member about said axis, means connected to said gyroscope and producing a signal output in response to the acceleration, torque generator means connected to the mounting of said member at said axis for applying torque to said member about said axis, velocity generator means connected to said member and producing a signal in proportion to speed of movement of said member about said axis, means interconnecting said signal producing means and said velocity generator means to said torque generator to control the energization of the same, and a second signal producing means connected to said member at said axis and responsive to displacement of said member about said axis, an indicator means, and means connecting said second signal producing means and said first signal producing means to said indicator to indicate displacement of said object about said axis with respect to true vertical.

3. Apparatus of the class described comprising, a member pivotally and pendulously mounted about an axis and upon an object whose attitude and acceleration it is desired to determine, a single degree of freedom gyroscope mounted on said member and positioned to respond to acceleration of said member about said axis, means connected to said gyroscope and producing a signal output in response to the acceleration, torque generator means connected to the mounting of said member at said axis for applying torque to said member about said axis, velocity generator means connected to said member and producing a signal in proportion to speed of movement of said member about said axis, means interconnecting said signal producing means and said velocity generator means to said torque generator to control the energization of the same, indicator means connected to said signal producing means to indicate the acceleration of said object, a second signal producing means connected to the mounting of said member at said axis and responsive to displacement of said member about said axis, a second indicator, means connecting said second signal producing means and said first signal producing means to said indicator to indicate displacement of said object about said axis with respect to true vertical.

4. Apparatus of the class described comprising, a member pivotally and pendulously mounted about an axis and upon an object whose attitude and acceleration it is desired to determine, a single degree of freedom gyroscope mounted on said member and positioned to respond to acceleration of said member about said axis, means connected to said gyroscope and producing a signal output in response to the acceleration, means included in said gyroscope for biasing said gyroscope to a neutral position wherein the output of said signal producing means is at a null output, torque generator means connected to the mounting of said member at said axis for applying torque to said member about said axis, velocity generator means connected to said member and producing a signal in proportion to speed of movement of said member about said axis, means interconnecting said signal producing means and said velocity generator means to said torque generator to control the energization of the same, and indicator means connected to said signal producing means to indicate the acceleration of said object.

5. The apparatus of claim 1 wherein the output of the velocity generator is connected to said first signal producing means and to said torque generator in a degenerated feedback arrangement.

6. The apparatus of claim 3 wherein the member is also pivotally mounted for displacement about a second axis normal to the first named axis and with a second gyroscope having a signal producing means identical to this first gyroscope also mounted on said member and responsive to acceleration about a second axis, a second torque generator, velocity generator, and second signal producing means associated with said second axis and said gyroscope and interconnected in the same manner, a pair of indicators connected respectively to said first signal producing means for the second gyroscope and the second signal producing means of the second gyroscope to produce respectively signals indicative of said acceleration and displacement in the same manner as the first named apparatus.

7. The apparatus of claim 1 wherein the gyroscope includes a torque generator mounted thereon which is continuously energized to bias the gyroscope toward a neutral position to null the signal producing means connected thereto.

8. The apparatus of claim 2 wherein said member is also mounted on said object for displacement about a second axis normal to the first named axis with a second gyroscope identical to the first gyroscope and also mounted on said member and having signal producing means and being responsive to acceleration about the second axis, a second torque generator, a second velocity generator and second signal producing means associated with said second displamement axis of said member and interconnected in the same manner as said first named gyroscope, and indicator means connected to said second signal producing means of said second axis and to the signal producing means of said second gyroscope to produce an indication in proportion to displacement of said member about said second displacement axis.

References Cited in the file of this patent

UNITED STATES PATENTS

| | | |
|---|---|---|
| 1,236,993 | Sperry | Aug. 14, 1917 |
| 1,732,677 | Fieux | Oct. 22, 1929 |
| 2,591,697 | Hays | Apr. 8, 1952 |
| 2,597,151 | Konet | May 20, 1952 |